US012197692B2

(12) United States Patent
Mori et al.

(10) Patent No.: US 12,197,692 B2
(45) Date of Patent: Jan. 14, 2025

(54) OPERATION MONITORING DEVICE, OPERATION MONITORING METHOD, AND OPERATION MONITORING PROGRAM

(71) Applicant: Nippon Telegraph and Telephone Corporation, Tokyo (JP)

(72) Inventors: Tomonori Mori, Musashino (JP);
Taisuke Wakasugi, Musashino (JP);
Masashi Tadokoro, Musashino (JP);
Akira Kataoka, Musashino (JP);
Haruo Oishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/037,220

(22) PCT Filed: Nov. 18, 2020

(86) PCT No.: PCT/JP2020/043086
§ 371 (c)(1),
(2) Date: May 16, 2023

(87) PCT Pub. No.: WO2022/107261
PCT Pub. Date: May 27, 2022

(65) Prior Publication Data
US 2024/0004508 A1 Jan. 4, 2024

(51) Int. Cl.
*G06F 3/0481* (2022.01)
(52) U.S. Cl.
CPC .................................. *G06F 3/0481* (2013.01)

(58) Field of Classification Search
CPC .................................................. G06F 3/048–05
See application file for complete search history.

(56) References Cited

U.S. PATENT DOCUMENTS

| | | | |
|---|---|---|---|
| 5,510,978 A * | 4/1996 | Colgan | G06Q 10/10 715/251 |
| 9,501,473 B1 * | 11/2016 | Kong | G06F 3/067 |
| 10,122,723 B1 * | 11/2018 | Chang | G06F 21/604 |
| 10,375,003 B1 * | 8/2019 | Olsen | G06Q 40/02 |
| 10,552,796 B1 * | 2/2020 | Delacourt | G06Q 10/103 |

(Continued)

FOREIGN PATENT DOCUMENTS

| | | |
|---|---|---|
| JP | 2006260364 | 9/2006 |
| JP | 2017072872 | 4/2017 |

*Primary Examiner* — Daniel Rodriguez
(74) *Attorney, Agent, or Firm* — Fish & Richardson P.C.

(57) ABSTRACT

A storage unit stores display information related to display of UI extension components of GUI components constituting a predetermined application for each user type including an implementer and a supervisor, and an operation rule that specifies an operation according to the user type when there is an input for a predetermined UI extension component. A display control unit displays, to the supervisor, a UI extension component that accepts an input as to whether or not to grant approval while referring to the display information and the operation rule when detecting an input for the predetermined UI extension component displayed to the implementer. An input execution unit executes, to a target GUI component, the input for the UI extension component made by the implementer while referring to the operation rule when detecting an input of approval for the UI extension component displayed to the supervisor.

6 Claims, 6 Drawing Sheets

(56) References Cited

U.S. PATENT DOCUMENTS

| | | | |
|---|---|---|---|
| 10,810,528 B1* | 10/2020 | Phillips | G06N 20/00 |
| 11,720,836 B1* | 8/2023 | Coles | G06N 5/04 |
| | | | 705/7.14 |
| 2006/0107197 A1* | 5/2006 | Friend | G06F 40/174 |
| | | | 715/234 |
| 2006/0107224 A1* | 5/2006 | Friend | G06F 40/174 |
| | | | 715/764 |
| 2006/0206506 A1* | 9/2006 | Fitzpatrick | G06Q 20/20 |
| 2011/0196931 A1* | 8/2011 | Clagg | H04L 51/212 |
| | | | 709/206 |
| 2020/0065912 A1* | 2/2020 | Bender | G10L 17/00 |

* cited by examiner (a)

(b)

(a)

(b)

OPERATION MONITORING DEVICE, OPERATION MONITORING METHOD, AND OPERATION MONITORING PROGRAM

CROSS-REFERENCE TO RELATED APPLICATIONS

This application is a National Stage application under 35 U.S.C. § 371 of International Application No. PCT/JP2020/043086, having an International Filing Date of Nov. 18, 2020, the disclosure of which is considered part of the disclosure of this application, and is incorporated by reference in its entirety into this application.

TECHNICAL FIELD

The present invention relates to an operation monitoring apparatus, an operation monitoring method, and an operation monitoring program.

BACKGROUND ART

Conventionally, an annotation technology of displaying an extended user interface (UI) on an operation screen to display information required by a user of an application without modifying an application of an existing system is known. For example, there is known a technology of appropriately performing a UI extension display according to a work scene by defining a work scene for performing the UI extension display and a display rule for each work scene (refer to Patent Literature 1).

CITATION LIST

Patent Literature

Patent Literature 1: JP 2017-072872 A

SUMMARY OF INVENTION

Technical Problem

However, in the existing annotation technology, it is difficult to input the input content of an implementer using the extended UI into the application after a supervisor approves the input content. For example, when multiple persons such as the supervisor check the operation of the implementer in the operation work in which no mistake is allowed, it is difficult for the supervisor to stop the operation even if the supervisor notices that the operation such as the input using the extended UI of the implementer is incorrect.

The present invention has been made in view of the above, and an object of the present invention is to make it possible to reliably input the input content of the implementer using the extended UI into the application after the supervisor approves the input content.

Solution to Problem

In order to solve the above problem and achieve the object, an operation monitoring apparatus according to the present invention includes: a storage unit that stores display information related to display of UI extension components of GUI components constituting a predetermined application for each user type including an implementer and a supervisor, and an operation rule that specifies an operation according to the user type when there is an input for a predetermined UI extension component; a display control unit that displays, to the supervisor, a UI extension component that accepts an input as to whether or not to grant approval while referring to the display information and the operation rule when detecting an input for the predetermined UI extension component displayed to the implementer; and an input execution unit that executes, to a target GUI component, the input for the UI extension component made by the implementer while referring to the operation rule when detecting an input of approval for the UI extension component displayed to the supervisor.

Advantageous Effects of Invention

According to the present invention, it is possible to reliably input the input content of the implementer using the extended UI into the application after the supervisor approves the input content.

DESCRIPTION OF EMBODIMENTS

Hereinafter, an embodiment of the present invention will be described in detail with reference to the drawings. Note that the present invention is not limited by this embodiment. Further, in the description of the drawings, the same portions are denoted by the same reference signs.

[Configuration of Monitoring Apparatus]

Figure 1:
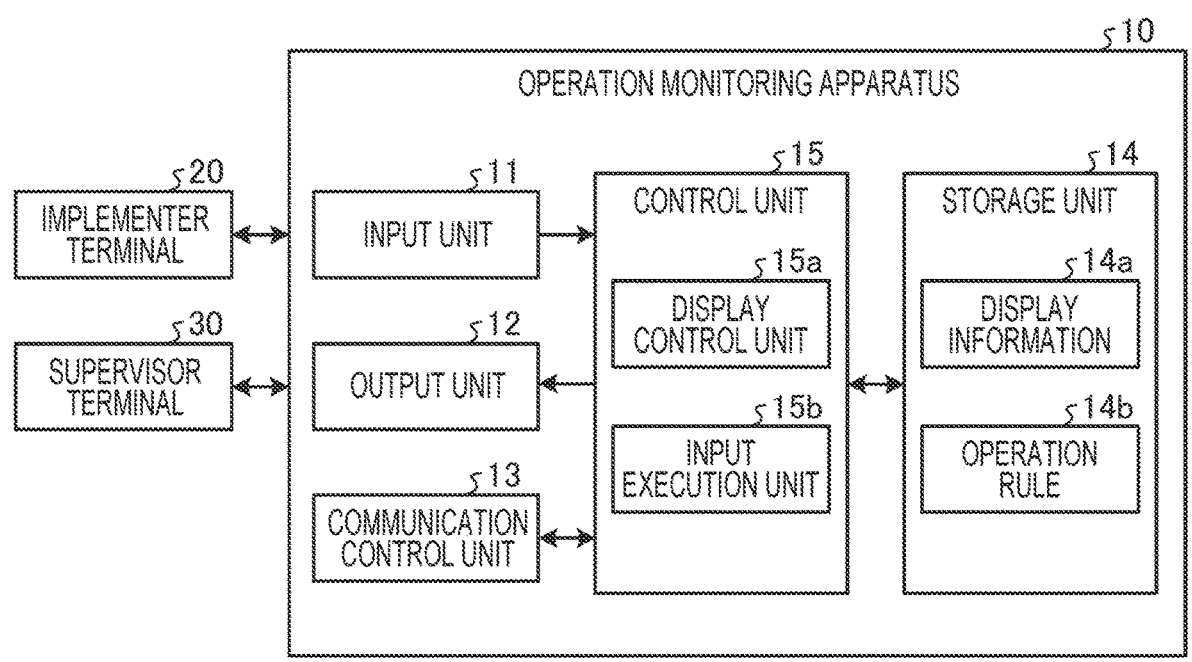
FIG. 1 is a schematic diagram illustrating a schematic configuration of an operation monitoring apparatus according to this embodiment.

FIG. 1 is a schematic diagram illustrating a schematic configuration of an operation monitoring apparatus 10 according to this embodiment. As illustrated in FIG. 1, the operation monitoring apparatus 10 of this embodiment is realized by a general-purpose computer such as a workstation or a personal computer, and includes an input unit 11, an output unit 12, a communication control unit 13, a storage unit 14, and a control unit 15.

The input unit 11 is realized by using an input device such as a keyboard and a mouse, and inputs various kinds of instruction information such as a processing start to the control unit 15 in response to an input operation by an implementer. The output unit 12 is realized by a display device such as a liquid crystal display, a printing device such as a printer, an information communication device, or the like.

The communication control unit 13 controls communication with an external apparatus via a telecommunication line such as a local area network (LAN) or the Internet. For example, the communication control unit 13 controls communication between the control unit 15 and an implementer terminal 20 operated by the implementer, a supervisor terminal 30 operated by a supervisor, or the like.

In this embodiment, the implementer terminal 20 is used by the implementer to perform an operation using, for example, a business application. The supervisor terminal 30 is used by the supervisor to monitor the operation of the implementer in operation monitoring processing to be described later. Note that the operation monitoring apparatus 10 of this embodiment may be mounted in the same hardware as any one of the implementer terminal 20 and the supervisor terminal 30.

The storage unit 14 is realized by a semiconductor memory element such as a random access memory (RAM) or a flash memory or a storage device such as a hard disk or an optical disk. Note that the storage unit 14 may be configured to communicate with the control unit 15 via a telecommunication line such as a LAN or the Internet.

In this embodiment, the storage unit 14 stores, for example, display information 14*a*, an operation rule 14*b*, and the like in addition to GUI component identification information for identifying a GUI component corresponding to a UI extension component among GUI components constituting a predetermined application such as a business application.

The display information 14*a* is information on display of the UI extension component of the GUI component for each user type including the implementer and the supervisor. For example, the display information 14*a* is information for specifying a position, a form, and the like regarding how to display the UI extension component as annotation display. The display information 14*a* of this embodiment includes a user type such as the implementer/supervisor. Furthermore, the display information 14*a* can be set to display multiple UI extension components for each group.

Figure 2:
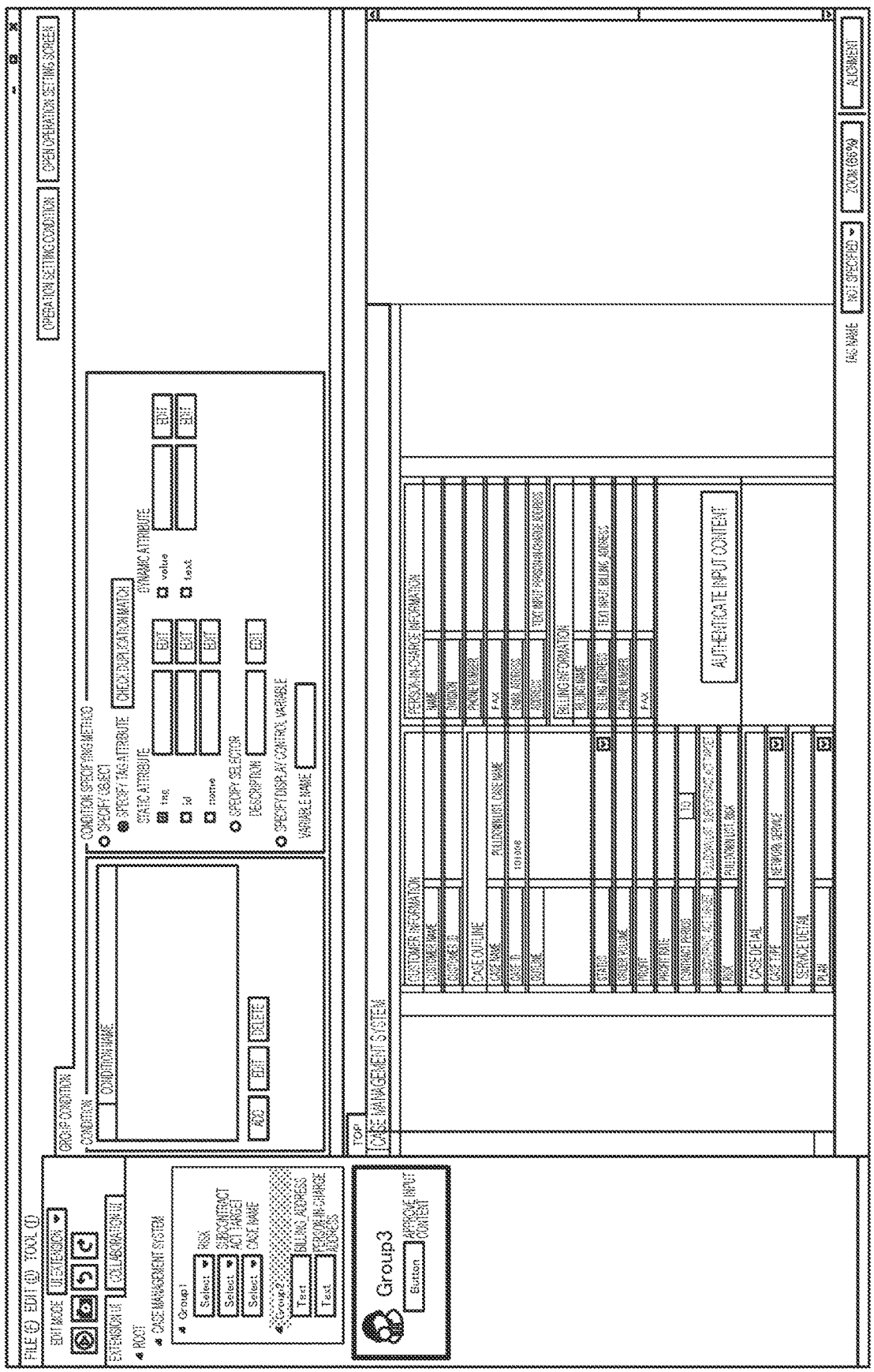
FIG. 2 is a diagram illustrating display information.

Here, FIG. 2 is a diagram illustrating display information. FIG. 2 illustrates a GUI screen for generating and editing the display information 14*a*. As illustrated in FIG. 2, the display information 14*a* is generated and edited with a GUI component specified on the screen. FIG. 2 illustrates, for example, a UI extension component that is displayed so as to be superimposed on a GUI component for inputting "Subcontract Act Target" and is used for input using a pull-down list.

In addition, "Risk", "Case Name", and "Subcontract Act Target" are set to be displayed to the implementer as one group "Group1" (user type: implementer). Similarly, the UI extension components "Billing_Address" and "Person-in-charge Address" for text input are set to be displayed to the implementer as one group "Group2" (user type: implementer).

By setting the groups of the multiple UI extension components in this manner, in the operation monitoring processing to be described later, it is possible to determine, on a group basis, whether or not the input for the multiple UI extension components that meets conditions has been completed, and set the UI extension components as a target for approval by the supervisor.

In addition, as Group3, the UI extension component "Approve Input Content" (user type: supervisor) displayed only to the supervisor for accepting an input of approval by using a button is set. In the operation monitoring processing to be described later, when the input by the implementer using the UI extension components is completed for each group, the UI extension component of Group 3 is displayed only to the supervisor for accepting an input of approval by the supervisor.

The description returns to FIG. 1. The operation rule 14*b* is information for specifying an operation according to the user type when there is an input for the predetermined UI extension component. For example, the operation rule 14*b* is information for specifying a condition of what kind of input is to be accepted for the displayed UI extension component, to which GUI component the input for the UI extension component that meets the condition is to be executed, and the like.

In this embodiment, according to the user type, for example when there is an input that meets the condition for the UI extension component displayed to the implementer, the operation rule 14*b* specifies the UI extension component to be displayed to the supervisor. Meanwhile, when there is an input that meets the condition for the UI extension component displayed to the supervisor, the operation rule 14*c* specifies the GUI component for which the input is to be made by the implementer.

Note that the display information 14*a* does not necessarily have to include the user type. For example, in the setting of the operation rule 14*b*, the display information 14*a* may also include identification information corresponding to identification information for identifying the UI extension component or the group to be displayed to the supervisor.

The control unit 15 is implemented by a central processing unit (CPU) or the like, executes a processing program stored in a memory, and functions as a display control unit 15*a* and an input execution unit 15*b* as illustrated in FIG. 1. Note that these functional units may be respectively implemented in different pieces of hardware. Furthermore, the control unit 15 may have other functional units.

The display control unit 15*a* displays the UI extension component to the implementer as annotation display. For example, with reference to the GUI component identification information and the display information 14*a*, the display control unit 15*a* displays the predetermined UI extension component by superimposing it on the GUI component displayed on the screen of the implementer terminal 20 via the communication control unit 13.

In addition, the display control unit 15*a* also displays, to the supervisor, the UI extension component displayed to the implementer and the input for this UI extension component. For example, the display control unit 15*a* displays the predetermined UI extension component by superimposing it on the GUI component displayed on the screen of the supervisor terminal 30 via the communication control unit 13, as on the screen of the implementer terminal 20. In addition, when there is an input for the UI extension component from the implementer terminal 20, the display control unit 15*a* also displays the input content on the supervisor terminal 30.

Then, when detecting an input for the predetermined UI extension component displayed to the implementer, the display control unit 15*a* displays, to the supervisor, the UI extension component that accepts an input as to whether or not to grant approval while referring to the display information 14*a* and the operation rule 14*b*.

Specifically, the display control unit 15*a* refers to the operation rule 14*b* and, when there is an input that meets the condition from the implementer terminal 20, specifies the predetermined UI extension component to be displayed to the supervisor terminal 30 in order to accept an input as to whether or not to grant approval. Further, the display control unit 15*a* refers to the display information 14*a*, and displays and outputs the specified UI extension component to the supervisor terminal 30.

Note that the display control unit 15*a* may also accept an input by the supervisor for changing the input for the UI extension component displayed to the implementer. For example, the display control unit 15*a* may accept an input for changing the input of the implementer while displaying, to the supervisor terminal 30, the UI extension component that accepts an input as to whether or not to grant approval. As a result, the supervisor can correct and approve the input of the implementer, which can facilitate monitoring work.

Alternatively, the display control unit 15a may notify the implementer of a message requesting a change of the input when there is no input of approval by the supervisor for more than a predetermined period.

Figure 3:
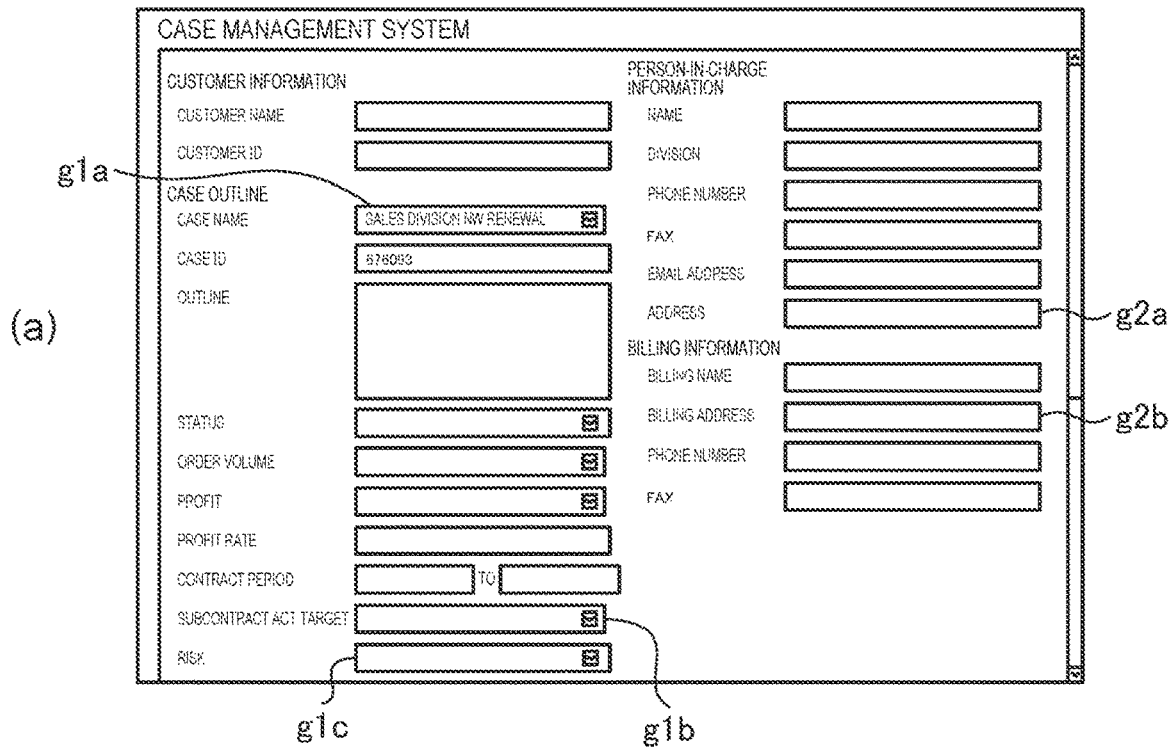
FIG. 3 is a diagram illustrating processing of a display control unit.
Figure 3:
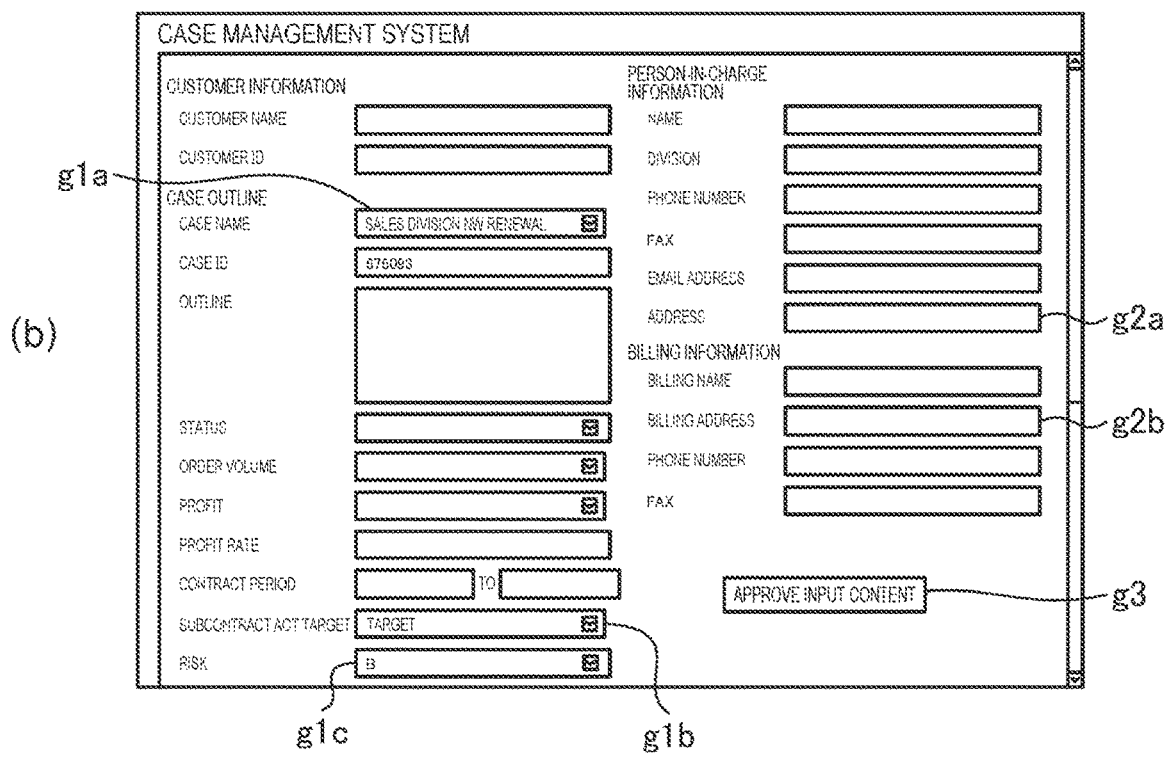
Figure 4:
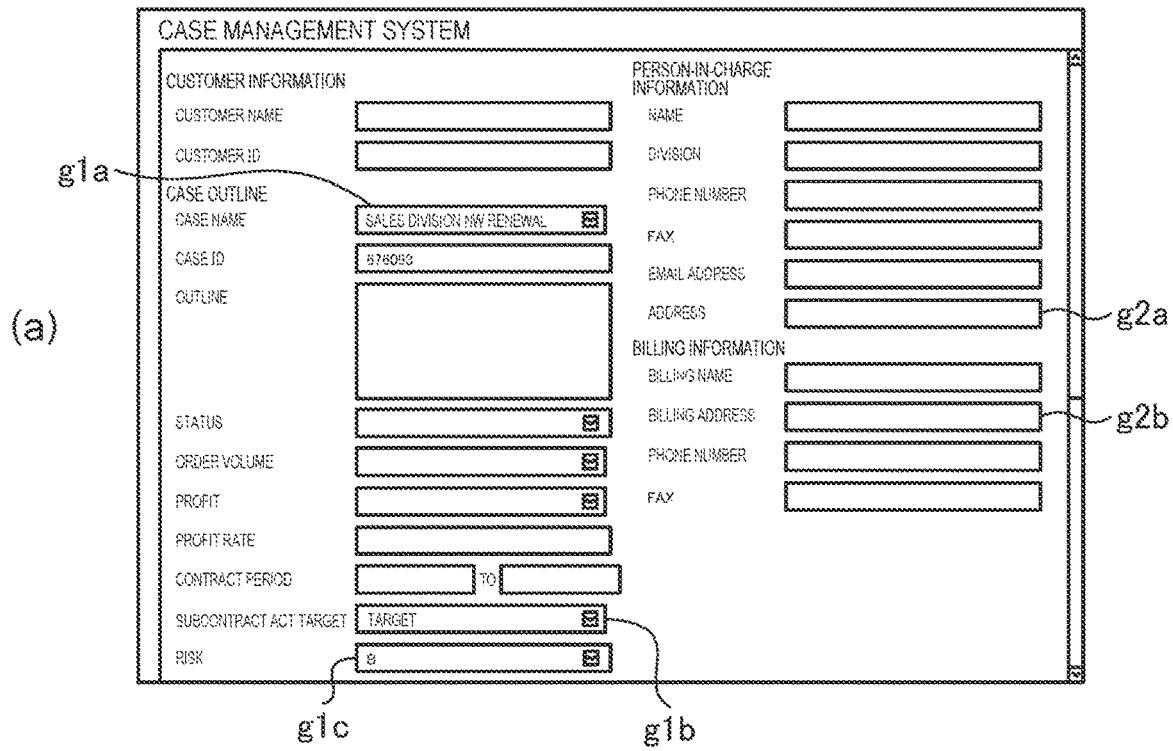
FIG. 4 is a diagram illustrating processing of the display control unit.
Figure 4:
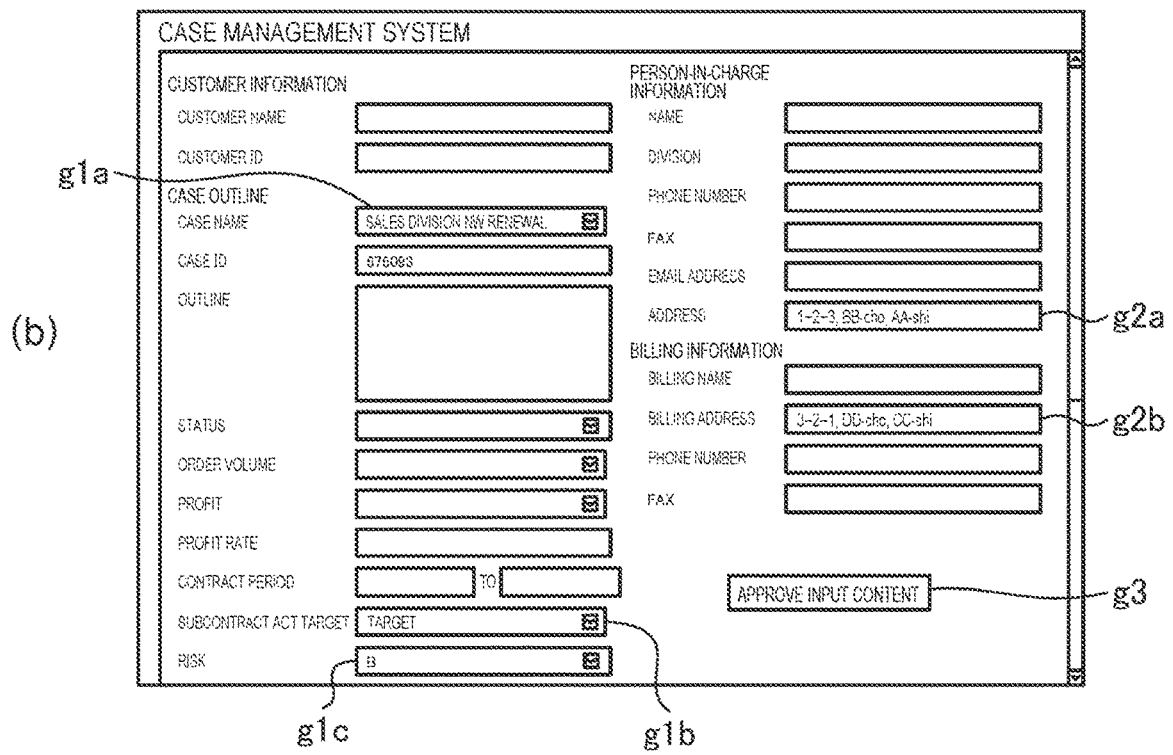

Here, FIGS. 3 and 4 are diagrams illustrating processing of the display control unit. In the example illustrated in FIG. 3, UI extension components g1a to g1c of Group 1 and UI extension components g2a to g2b of Group 2 illustrated in FIG. 2 are displayed on the implementer terminal 20 and the supervisor terminal 30. In addition, FIG. 3(a) illustrates a case where the implementer makes an input to the UI extension component g1a being a part of Group 1. Further, FIG. 3(b) illustrates a case where the implementer has completed the input to all the UI extension components g1a to g1c of Group 1.

As illustrated in FIG. 3(b), when the implementer completes the input to all the UI extension components g1a to g1c of Group 1, a UI extension component g3 that accepts an input of approval by the supervisor is displayed on the supervisor terminal 30.

The description returns to FIG. 1. When detecting an input of approval for the UI extension component displayed to the supervisor, the input execution unit 15b executes, to the target GUI component, the input for the UI extension component made by the implementer while referring to the operation rule 14c.

Specifically, when the supervisor presses the "Approve Input Content" button g3 illustrated in FIG. 3(b) to make an input of approval in the supervisor terminal 30, the input execution unit 15b detects this via the communication control unit 13. In this case, the input execution unit 15b executes, to the GUI components specified by the operation rule 14c, the input for the UI extension components g1a to g1c of Group 1 made by the implementer.

Here, FIG. 4(a) illustrates a case where, after the supervisor makes the input of approval using the "Approve Input Content" button g3 illustrated in FIG. 3(b), the input for the UI extension components g1a to g1c of Group 1 made by the implementer is reflected on the GUI components specified by the operation rule 14c. In this case, as illustrated in FIG. 4(a), the "Approve Input Content" button g3 disappears from the screen of the supervisor terminal 30.

Then, as illustrated in FIG. 4(b), when the implementer completes the input for all the UI extension components g2a and g2b of Group 2, the UI extension component g3 that accepts an input of approval by the supervisor is displayed as in the case of FIG. 3(b).

In this manner, the operation monitoring apparatus 10 determines, on a group basis, whether or not the input for the multiple UI extension components that meets conditions has been completed, and sets the UI extension components as a target for approval by the supervisor. In addition, when the input by the implementer using the UI extension components is completed for each group, the UI extension component of Group 3 is displayed only to the supervisor for accepting an input of approval by the supervisor. As a result, the operation monitoring apparatus 10 can reliably input the input content of the implementer using the extended UI into the application after the supervisor approves the input content on a group basis.

[Operation Monitoring Processing]

Figure 5:
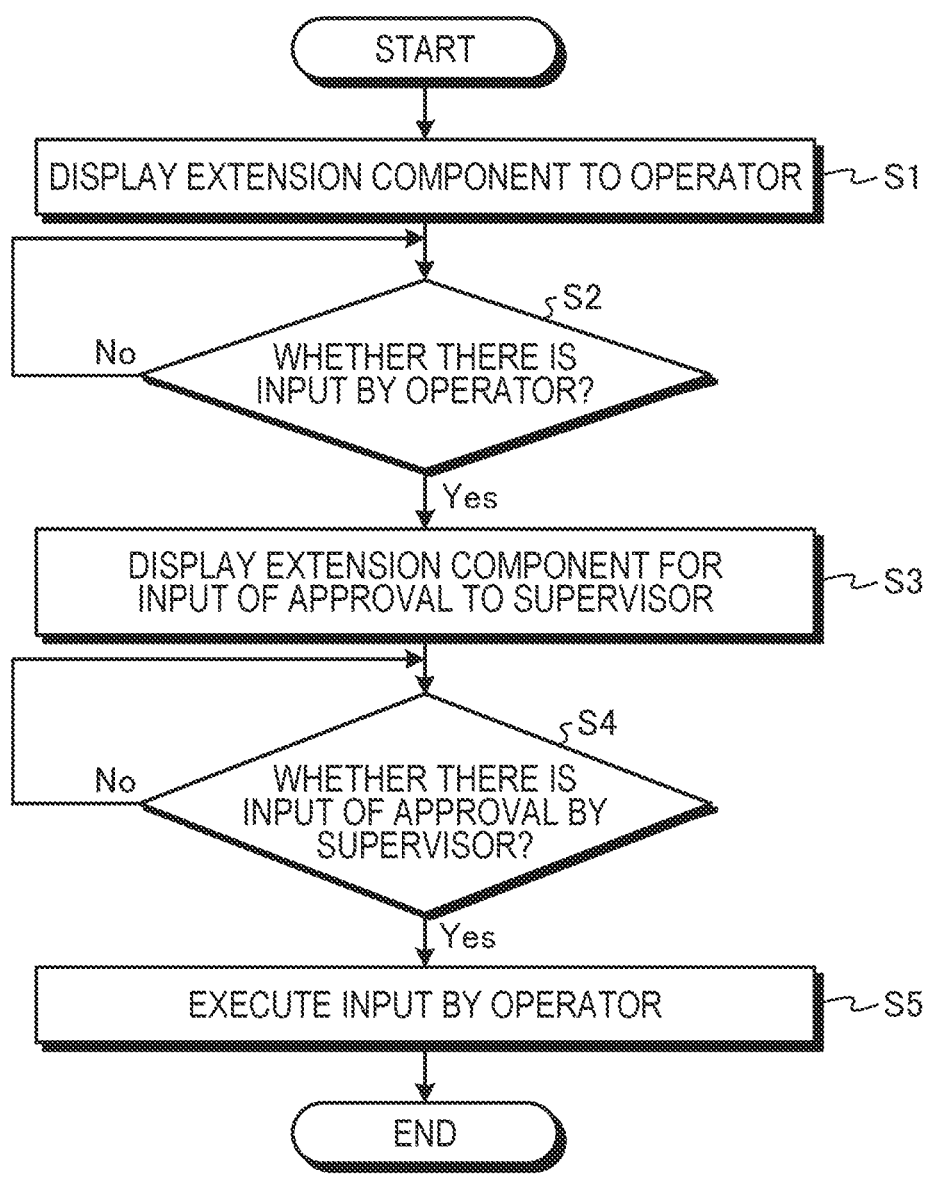
FIG. 5 is a flowchart illustrating an operation monitoring processing procedure.

Next, FIG. 5 is a flowchart illustrating an operation monitoring processing procedure. The flowchart of FIG. 5 is started, for example, at a timing when an input for making an instruction to start the operation monitoring processing is made.

First, the display control unit 15a displays the UI extension component to the implementer as annotation display (step S1). For example, with reference to the GUI component identification information and the display information 14a, the display control unit 15a displays the predetermined UI extension component by superimposing it on the GUI component displayed on the screen of the implementer terminal 20 via the communication control unit 13.

Then, the display control unit 15a iterates check until there is an input for the predetermined UI extension component displayed to the implementer of the implementer terminal 20 (step S2, No). When detecting an input by the implementer (step S2, Yes), the display control unit 15a displays, to the supervisor of the supervisor terminal 30, the UI extension component that accepts an input as to whether or not to grant approval while referring to the display information 14a and the operation rule 14b (step S3).

The input execution unit 15b iterates check until there is an input for the UI extension component that accepts an input of approval displayed to the supervisor of the supervisor terminal 30 (step S4, No). When detecting an input of approval by the supervisor (step S4, Yes), the input execution unit 15b executes, to the target GUI component, the input for the UI extension component made by the implementer while referring to the operation rule 14c (step S5). In this manner, a series of the operation monitoring processing ends.

Note that, when there is no input of approval by the supervisor for more than a predetermined period in the processing of step S4, the input execution unit 15b may return the process to step S2. The input execution unit 15b may also notify the implementer of a message requesting a change of the input.

As described above, in the operation monitoring apparatus 10 according to this embodiment, the storage unit 14 stores the display information 14a related to the display of the UI extension components of the GUI components constituting the predetermined application for each user type including the implementer and the supervisor, and the operation rule 14b that specifies the operation according to the user type when there is an input for the predetermined UI extension component. In addition, when detecting an input for the predetermined UI extension component displayed to the implementer, the display control unit 15a displays, to the supervisor, the UI extension component that accepts an input as to whether or not to grant approval while referring to the display information 14a and the operation rule 14b. Further, when detecting an input of approval for the UI extension component displayed to the supervisor, the input execution unit 15b executes, to the target GUI component, the input for the UI extension component made by the implementer while referring to the operation rule 14b.

In this manner, the operation monitoring apparatus 10 makes an input for the application after the supervisor approves the operation content by the implementer. This makes it possible to reliably input the input content of the implementer using the extended UI into the application after the supervisor approves the input content.

In addition, the display control unit 15a displays, to the supervisor, the UI extension component displayed to the implementer and the input for this UI extension component. This enables the supervisor to easily check the operation content of the implementer and thus easily perform monitoring.

Further, the display control unit 15a may accept an input by the supervisor to change the input for the UI extension component displayed to the implementer. As a result, the supervisor can correct and approve the input of the implementer, which can facilitate monitoring work.

Furthermore, the input execution unit 15b may notify the implementer of a message requesting a change of the input when there is no input of approval by the supervisor for more than a predetermined period. This enables the implementer to review the input.

In addition, the display information 14a can be set to display the multiple UI extension components for each group. This makes it possible to check the input content of the implementer for each group, and thus perform monitoring reasonably.

[Program]

It is also possible to create a program that describes, in a computer executable language, the processing to be executed by the operation monitoring apparatus 10 according to the above embodiment. In an embodiment, the operation monitoring apparatus 10 can be implemented by installing an operation monitoring program for executing the above operation monitoring processing as packaged software or online software in a desired computer. For example, by causing an information processing apparatus to execute the above operation monitoring program, it is possible to cause the information processing apparatus to function as the operation monitoring apparatus 10. The information processing apparatus mentioned here includes a desktop or notebook personal computer. Further, in addition to the computer, the information processing apparatus includes mobile communication terminals such as a smartphone, a mobile phone, and a personal handyphone system (PHS), and further includes a slate terminal such as a personal digital assistant (PDA).

Further, the operation monitoring apparatus 10 can also be implemented as a server device with a terminal device used by a user as a client which provides the client with a service related to the operation monitoring processing mentioned above. For example, the operation monitoring apparatus 10 is implemented as a server device that provides an operation monitoring processing service for inputting a web page and outputting display of additional information. In this case, the operation monitoring apparatus 10 may be implemented as a Web server, or may be implemented as a cloud that provides a service related to the above operation monitoring processing by outsourcing. Hereinafter, an example of a computer that executes the operation monitoring program which realizes a function similar to that of the operation monitoring apparatus 10 will be described.

Figure 6:
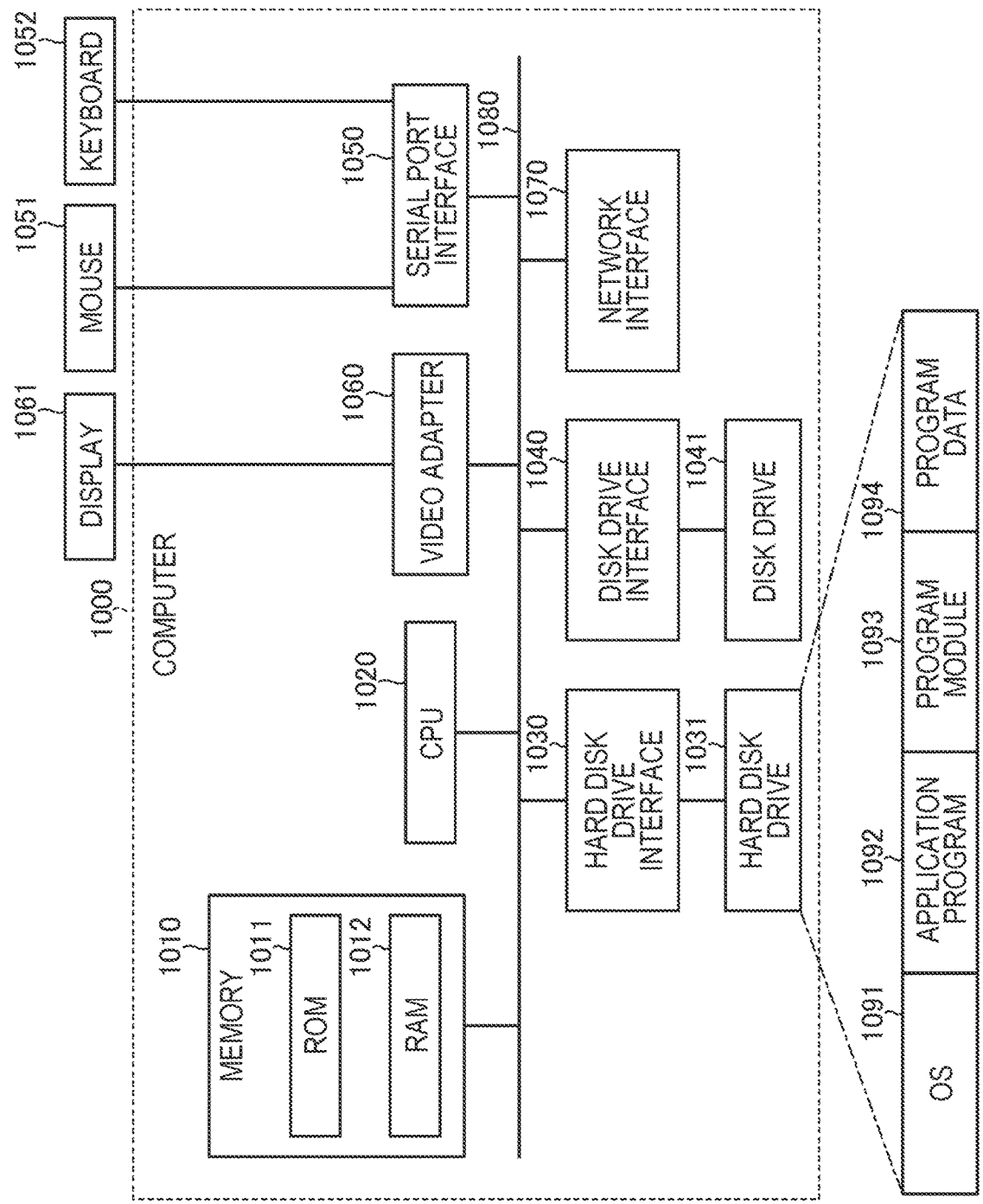
FIG. 6 is a diagram illustrating a computer that executes an operation monitoring program.

FIG. 6 is a diagram illustrating an example of a computer that executes the operation monitoring program. A computer 1000 includes, for example, a memory 1010, a CPU 1020, a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a removable storage medium such as a magnetic disk or an optical disk is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. The information described in the above embodiment is stored in the hard disk drive 1031 or the memory 1010, for example.

In addition, the operation monitoring program is stored in the hard disk drive 1031 as the program module 1093 in which commands to be executed by the computer 1000, for example, are described. Specifically, the program module 1093 in which the series of processing to be executed by the operation monitoring apparatus 10 described in the above embodiment is described is stored in the hard disk drive 1031.

Further, data used for information processing executed by the operation monitoring program is stored as the program data 1094 in the hard disk drive 1031, for example. Then, the CPU 1020 reads, in the RAM 1012, the program module 1093 and the program data 1094 stored in the hard disk drive 1031 as needed and executes each procedure described above.

Note that the program module 1093 and the program data 1094 related to the operation monitoring program are not limited to being stored in the hard disk drive 1031, and may be stored in, for example, a removable storage medium and read by the CPU 1020 via the disk drive 1041 or the like. Alternatively, the program module 1093 and the program data 1094 related to the operation monitoring program may be stored in another computer connected via a network such as a local area network (LAN) or a wide area network (WAN) and may be read by the CPU 1020 via the network interface 1070.

Although the embodiment to which the invention made by the present inventor is applied has been described above, the present invention is not limited by the description and drawings constituting a part of the disclosure of the present invention according to this embodiment. In other words, other embodiments, examples, operation techniques, and the like made by those skilled in the art and the like on the basis of this embodiment are all included in the scope of the present invention.

REFERENCE SIGNS LIST

10 OPERATION MONITORING APPARATUS
11 INPUT UNIT
12 OUTPUT UNIT
13 COMMUNICATION CONTROL UNIT
14 STORAGE UNIT
14a DISPLAY INFORMATION
14b OPERATION RULE
15 CONTROL UNIT
15a DISPLAY CONTROL UNIT
15b INPUT EXECUTION UNIT
20 IMPLEMENTER TERMINAL
30 SUPERVISOR TERMINAL

The invention claimed is:

1. An operation monitoring apparatus comprising:
a storage unit configured to store display information related to display of user interface (UI) extension components of graphical user interface (GUI) components constituting a predetermined application for each user type including an implementer and a supervisor, and an operation rule that specifies an operation according to the user type when there is an input content provided using a first UI extension component;

a processor; and a memory device storing instructions that, when executed by the processor, configure the processor to:

display, to the implementer and the supervisor, the first UI extension component to be input by the implementer;

receive, from the implementer, the input content using the first UI extension component;

display, to the implementer and the supervisor, the input content;

display, to the supervisor, a second UI extension component that accepts an input as to whether or not to grant approval while referring to the display information and the operation rule when detecting the input content provided using the first UI extension component is completed; and execute, to a target GUI component, the input content provided using the first UI extension component from the implementer while referring to the operation rule when detecting an input of approval using the second UI extension component displayed to the supervisor.

2. The operation monitoring apparatus according to claim 1, wherein the processor is configured to accept an input by the supervisor to change the input content provided using the first UI extension component displayed to the implementer.

3. The operation monitoring apparatus according to claim 1, wherein the processor is configured to notify the implementer of a message requesting a change of the input content when there is no input of approval by the supervisor for more than a predetermined period.

4. The operation monitoring apparatus according to claim 1, wherein the display information is settable to display one or more groups of UI extension components.

5. An operation monitoring method executed by an operation monitoring apparatus, wherein the operation monitoring apparatus comprises a storage unit configured to store display information related to display of user interface (UI) extension components of graphical user interface (GUI) components constituting a predetermined application for each user type including an implementer and a supervisor, and an operation rule that specifies an operation according to the user type when there is an input content provided using a first UI extension component, and the method comprises:

displaying, to the implementer and the supervisor, the first UI extension component to be input by the implementer;

receiving, from the implementer, the input content using the first UI extension component;

displaying, to the implementer and the supervisor, the input content;

displaying, to the supervisor, a second UI extension component that accepts an input as to whether or not to grant approval while referring to the display information and the operation rule when detecting the input content provided using the first UI extension component is completed; and executing, to a target GUI component, the input content provided using the first UI extension component from the implementer while referring to the operation rule when detecting an input of approval using the second UI extension component displayed to the supervisor.

6. A non-transitory computer readable medium storing a program, wherein executing of the program causes a computer to execute operations comprising:

displaying, to an implementer and a supervisor, a first UI extension component to be input by the implementer;

receiving, from the implementer, an input content using the first UI extension component;

displaying, to the implementer and the supervisor, the input content;

displaying, to the supervisor, a second UI extension component that accepts an input as to whether or not to grant approval while referring to display information and an operation rule when detecting the input content provided using the first UI extension component is completed, wherein the display information and the operation rule are stored in a storage unit, wherein the display information is related to display of UI extension components of GUI components constituting a predetermined application for each user type including the implementer and the supervisor, and the operation rule specifies an operation according to the user type when there is the input content provided using the first UI extension component; and executing, to a target GUI component, the input content provided using the first UI extension component from the implementer while referring to the operation rule when detecting an input of approval using the second UI extension component displayed to the supervisor.

* * * * *